United States Patent
Lin et al.

(10) Patent No.: US 6,596,790 B2
(45) Date of Patent: Jul. 22, 2003

(54) PRECIPITATION PROCESS FOR MAKING POLYVINYLIDENE FLUORIDE POWDER COATINGS AND COATINGS MADE BY THE PROCESS

(75) Inventors: Shiow-Ching Lin, Lawrenceville, NJ (US); Michelle Kelly, East Windsor, NJ (US); Bradley Kent, Sicklerville, NJ (US)

(73) Assignee: Solvay Solexis, Inc., Thorofare, NJ (US)

( * ) Notice: Subject to any disclaimer, the term of this patent is extended or adjusted under 35 U.S.C. 154(b) by 0 days.

(21) Appl. No.: 09/964,185

(22) Filed: Sep. 25, 2001

(65) Prior Publication Data

US 2003/0060558 A1 Mar. 27, 2003

(51) Int. Cl.$^7$ .............................. C08J 3/14; C08F 6/22; C08L 27/16; C08K 3/22
(52) U.S. Cl. ...................... 523/332; 523/335; 524/567; 524/904; 525/934; 528/487; 528/488
(58) Field of Search ................... 523/332, 335; 524/464, 904, 567, 422, 431; 525/934; 528/487, 488

(56) References Cited

U.S. PATENT DOCUMENTS

| 3,824,115 A | | 7/1974 | Segawa |
|---|---|---|---|
| 4,185,000 A | | 1/1980 | Gebauer et al. |
| 4,391,763 A | | 7/1983 | Ueno et al. |
| 4,579,906 A | | 4/1986 | Zabrocki et al. |
| 4,770,939 A | | 9/1988 | Sietses et al. |
| 5,229,460 A | | 7/1993 | Yousuf et al. |
| 5,308,694 A | | 5/1994 | Andersson |
| 5,346,727 A | | 9/1994 | Simkin |
| 5,405,912 A | * | 4/1995 | Simkin |
| 5,599,873 A | * | 2/1997 | Verwey et al. |
| 5,739,202 A | | 4/1998 | Pecsok |
| 5,827,608 A | | 10/1998 | Rinehart et al. |
| 6,040,370 A | | 3/2000 | Wozny et al. |
| 6,221,429 B1 | * | 4/2001 | Verwey et al. ............ 427/195 |
| 6,340,720 B1 | * | 1/2002 | Lin et al. ................. 523/335 |

FOREIGN PATENT DOCUMENTS

EP    0 456 996 B1    11/1994

* cited by examiner

Primary Examiner—Tae H. Yoon
(74) Attorney, Agent, or Firm—Norris, McLaughlin & Marcus

(57) ABSTRACT

A process for making pigmented PVDF-based powder coatings by coagulation and powder based coatings made by the process. The process involves blending a PVDF latex and a water reducible acrylic polymer and pigment dispersion, adding coagulant to precipitate solid PVDF and pigment associated by ionic interaction with acrylic polymer binder, separating solids and drying the precipitate. Also, methods for coating substrates with the powder coating and coated substrates.

20 Claims, 1 Drawing Sheet

US 6,596,790 B2

PRECIPITATION PROCESS FOR MAKING POLYVINYLIDENE FLUORIDE POWDER COATINGS AND COATINGS MADE BY THE PROCESS

BACKGROUND OF THE INVENTION

1. Field of the Invention

The invention relates to a process for making polyvinylidene fluoride ("PVDF") powder coatings using a precipitation process in aqueous media. Specifically, the process involves the use of coagulation to precipitate PVDF and an acrylic resin blend from an aqueous dispersion prepared from blending PVDF latex and a water reducible acrylic resin solution or dispersion. The invention also involves pigmented PVDF-based powder coating compositions made by the coagulation process.

2. The Prior Art

PVDF coating compositions can be used for coating a large variety of metal substrates, including aluminum, steel and galvanized steel, and has wide acceptance as an architectural coating due to the properties of PVDF, including high crystallinity and photo-oxidative resistance, which provide for coatings that are weather resistant and stand up to corrosive or other harsh environments. In order to balance the performance of PVDF, a secondary resin is normally needed to, among other things, provide good adhesion to substrate and to reduce the shrinkage of the polyvinylidene fluoride due to excess crystallization. The secondary resin, which may be a thermoplastic polymer, enhances the film forming capabilities of the PVDF-based coating.

Commercial PVDF coating materials are generally solvent dispersions and release solvent during coating preparation. Solvent emission is generally managed by the end user through the installation and operation of an incineration system in a coating line. The incinerator will burn the VOC of the solvent emission to reduce or preclude harmful emission of VOC to the atmosphere. The need for an incinerator is, generally, a regulatory requirement. Thus, PVDF based paints in a solvent dispersion will require the end user to invest capital to install air pollution control apparatus, such as an incinerator, and incur costs to maintain the equipment and comply with regulatory requirements. These costs can be avoided by the use of solvent free coatings, such as PVDF-based powder coating preparations.

Additional benefits are obtained through use of solvent-free PVDF coating materials, such as powder coatings. Powders can be sold and shipped in a ready to use state thereby obviating any need by the end user for mixing, stirring or thinning during application. Powder based coatings can be used more efficiently than wet spray paint and the powder coatings have a higher percentage usage because the powder can be recycled during coating operations. The high raw material utilization associated with powder coating arises from the lack of any solvent requirement for application. Also, because the powder has no VOC there is significantly reduced absorption of energy during film forming on a substrate after application thereby resulting in energy savings by the end user during application. These, and other, advantages of PVDF-based powder coating compositions result in consumer and industrial demand for such coating products.

Because of the benefits of powder based coatings, there is increasing industrial and consumer demand for such coating compositions. Accordingly, the art is constantly evolving with novel processes for making PVDF-based powder coatings. The art is also constantly seeking novel PVDF-based coating materials with improved properties over existing coating compositions and formulations.

For example, relatively recent processes are described in U.S. Pat. Nos. 4,770,939 and 5,346,727 for obtaining PVDF-based powder coatings by cryogenic grinding of a melt extruded combination of PVDF and compatible thermoplastic. U.S. Pat. No. 5,229,460 describes a grinding process for making PVDF-based powder coatings that does not involve cryogenic conditions. A method for making a pigmented PVDF powder coating using a solvent removal process of a solvent based dispersion paint, but without coagulation of a polymer latex mixture, is described in U.S. Pat. No. 5,739,202. A process for making a powder comprising a (meth)acrylate polymer and fluoropolymer by combining two polymer latex phases without coagulation is described in U.S. Pat. No. 5,827,608. Some of the processes in the art are inefficient, and other processes in the art do not result in a PVDF-based powder coating that has acceptable pigmentation.

It was an object of the invention to develop an efficient coagulation method for making pigmented PVDF-based powder coating compositions.

It was a further object of the invention to develop a coagulation process that results in a powder coating that has sufficient pigmentation to provide even coloring when heat cured after application to a substrate.

It was another object of the invention to develop a coagulation process for making PVDF-based powder coatings that reduces the need for additives, such as surfactant, yet provide for an adequately pigmented coating.

It was another object of the invention to develop PVDF-based powder coating compositions having appropriate pigmentation and suitable properties for industrial coatings.

These, and other objects of the invention, are achieved by the process described herein involving coagulation of PVDF latex and a water reducible acrylic resin solution or dispersion. The aqueous acrylic resin comprises polymer chains containing side chain ionic moieties, which anchor onto the surface of pigment to form a stable acrylic polymer/pigment dispersion which does not require a surfactant to form. The acrylic polymer/pigment dispersion and PVDF latex are precipitated to obtain the pigmented powder coating composition. The pigmented powder coating composition can be applied to any number of substrates and is heat cured forming a pigmented film over the substrate having even and full color.

In the present Specification, all parts and percentages are by weight/weight unless otherwise specified.

SUMMARY OF THE INVENTION

The invention concerns coagulation of PVDF latex and a water reducible acrylic polymer solution or dispersion, containing either cationic or anionic species. The water reducible acrylic polymer phase further comprises pigment. The coagulation is induced by the addition of acid or base coagulant. For anionic species, acid coagulant is used and for cationic species, base coagulant is used. This coagulation process precipitates a desired homogeneous solid blend. After solid separation and spray drying, a powder suitable for powder coating is produced.

The PVDF-based powder coating compositions are generally applied to a substrate in powder form. The powder coated substrate is heated to fuse the PVDF and the water reducible polymer, preferably in the form of an acrylic polymer/pigment dispersion, in a continuous film coating on the substrate. In order to obtain the continuous film coating, the PVDF and water reducible acrylic polymer must be miscible during and after fusion, and the water reducible acrylic polymer is selected for the powder coating composition to have this miscibility.

DETAILED DESCRIPTION OF THE INVENTION

Figure 1:
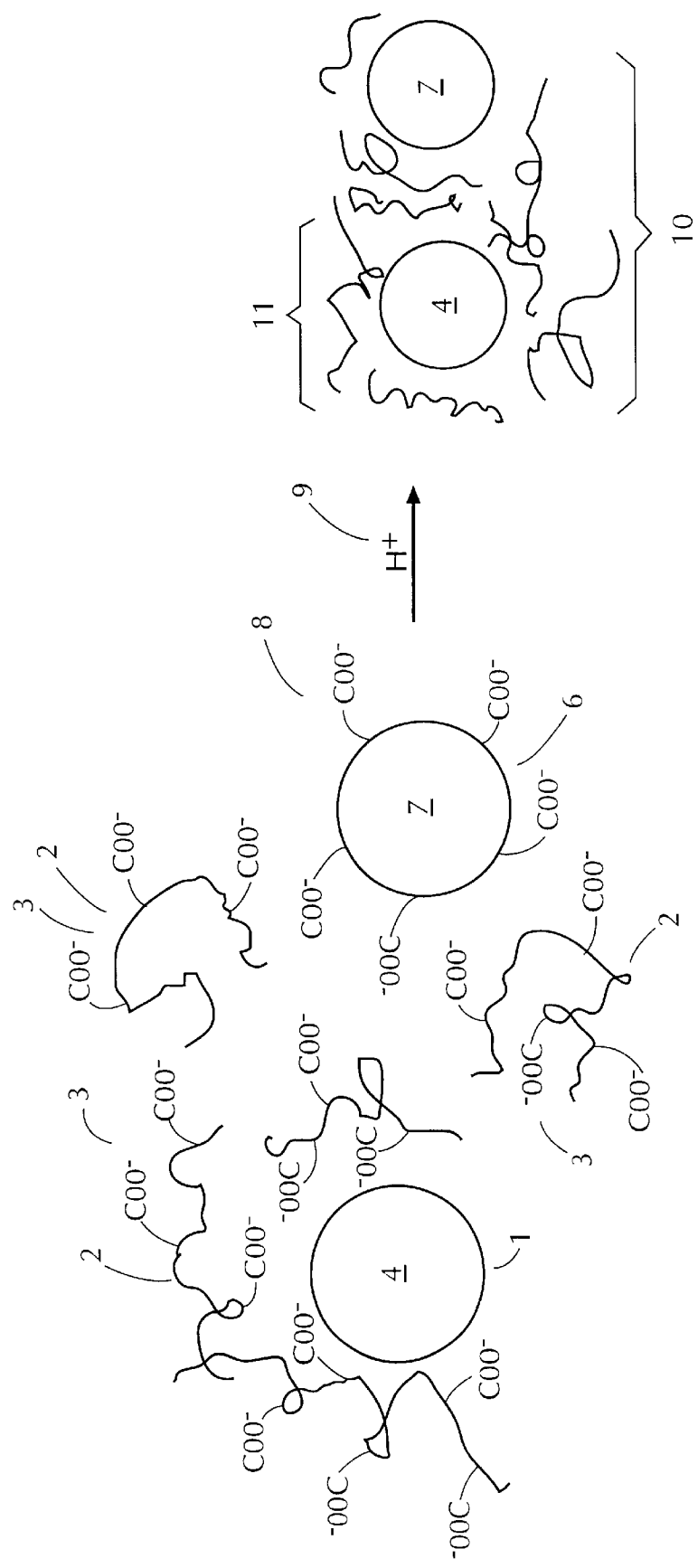
FIG. 1 is a schematic illustrating the molecular interaction of the water reducible acrylic polymer, pigment and PVDF in embodiments of the invention where the water reducible acrylic polymer comprises anionic species.

The term PVDF as used in the Specification pertains to homopolymers of vinylidene fluoride and copolymers comprising vinylidene fluoride and other monomers having about 80% to about 99% vinylidene fluoride and from about 1% to about 20% other monomers, preferably hexafluoropropylene. PVDF is produced by emulsion polymerization, the result of which is a latex. The invention uses PVDF latex from emulsion polymerization in the coagulation process for making a PVDF-based powder coating. Commercially available PVDF latexes, such as those available from Ausimont USA, Inc., Thorofare, N.J., U.S.A. under the tradename HYLAR®, such as HYLAR MP3 PVDF, may be used in the invention.

As discussed above, PVDF coatings generally require a secondary resin. The secondary resin must be selected such that it is miscible with PVDF during and after fusion by heating the powder coating, generally after application on a substrate.

PVDF is miscible with a wide range of polymers such as polymethacrylates, polyacrylates and polyvinyl acetates containing C=O groups in the ester, amide or ketone forms. The miscibility, in part, arises from the interaction between the C=O bonds of the polymethacrylates, polyacrylates and polyvinyl acetates, as the case may be, and the $CH_2$ groups of the vinylidene fluoride. For purposes of the invention, water reducible polymer containing ionic species, either cationic or anionic species, preferably anionic acrylic resins, are used as the secondary polymers in the powder coating compositions.

A particularly preferred secondary polymer is a water reducible form of polyalkyl (meth)acrylate, which is prepared by polymerization an alkyl (meth)acrylate with (meth) acrylic acid to generate a water reducible acrylic resin containing anionic species after neutralization. The water reducible polyalkyl (meth)acrylate may also be prepared by polymerization of an alkyl (meth)acrylate with a minimized amount of another (meth)acrylate containing amine group, such as N,N-dimethyl-2-aminoethyl (meth)acrylate to provide cationic species after neutralization with an acid. The content of comonomer with ionic species is minimized to an amount just enough to provide water dispersion ability or reducibility. The amount ranges from about 1 to about 20% of monomer content. The water reducible polyalky (meth) acrylate can also be prepared by polymerization of monomer combinations to give acrylic polymer with different performance. Examples of these are monomers selected from the group consisting of methyl methacrylate, ethyl methacrylate, methyl acrylate, ethyl acrylate, butyl methacrylate, butyl acrylate, hydroxyethyl methacrylate, and hydroxyethyl acrylate, or combinations thereof The PVDF-based powder coating composition is obtained by a process comprising the steps of (1) combining and blending polyvinylidene fluoride latex with a water reducible acrylic polymer phase which comprises an acrylic polymer/pigment dispersion which is the water reducible acrylic polymer having ionic species, such as side chain ionic moieties, in solution or dispersion in water with pigment, (2) coagulating the blend by addition of an acid or base to precipitate a solid mixture, (3) separating the solid precipitate from water, and (4) drying the solid precipitate. Grinding aids, fillers, and other additives to help coating performance can also be added before the coagulation step. The water-reducible polymer may be either anionic or cationic.

The PVDF latex is obtained by emulsion polymerization which generally involves use of anionic surfactant, such as water soluble fluorosurfactants which may be in the form of a salt of perfluorinated carboxylic acid which have a general formula of $X(CF_2)_n COO^-M^+$, where X is a hydrogen or fluorine, n is an integer from about 6 to about 20, preferably from about 8 to about 12 and $M^+$ is an alkali metal ion and ammonium ion. The PVDF latex used in the process of this invention will comprise these types of surfactant.

The water reducible acrylic polymer acts as a dispersing aid for the pigment. The pigment interacts with the acrylic polymer because of molecular attraction between the highly polar pigment surface and the ion species, such as the side chain ionic moieties, of the acrylic. The ionic attraction helps to bind the pigment to the polymer, such as anchoring on to the surface of the pigment, and provides for the pigment to precipitate out with the polymer during the precipitation process. Generally, a surfactant is needed to provide pigment with good dispersion ability in an aqueous medium, however, the invention does not involve use of additional surfactant to allow the pigment to form a uniform dispersion with the PVDF latex. After precipitation from the coagulation process, undesired emulsifiers in the PVDF latex mixture are removed.

Any type of pigments may used in the invention. Preferred pigments are, or will comprise, one or more of the following: titanium dioxide which is available from Whittaker, Clark & Daniels, South Plainfield, N.J., U.S.A.; Arctic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, U.S.A.; black F-2302, blue V-5200, turquoise F-5686, green F-5687, brown F-6109, buff F-6115, chestnut brown V-9186, and yellow V-9404 available from Ferro Corp., Cleveland, Ohio, U.S.A. and METEOR® pigments available from Englehard Industries, Edison, N.J., U.S.A.

Additives, such as chemicals helpful in coating formation or flow promoters, may be incorporated with either the water reducible acrylic polymer, or the PVDF emulsion, prior to coagulation. Examples of these additives are Lanco™ Flow P10 available from Lubrizol, Wickliffe, Ohio, U.S.A. and MODAFLOW® Powder available from Solutia, St. Louis, Mo., U.S.A. In addition, the introduction of anionic moieties to acrylic polymer may increase the water sensitivity of coating during service. Also, acrylic polymer may be prepared from crosslinkable monomer such as hydroxyethyl methacrylate. Therefore, a crosslinker, such as melamine formaldehyde resin, carbodiimide crosslinker or hydroxyalkyl amide, may be added to the system to improve coating performance.

The PVDF latex and the water reducible acrylic polymer phase are combined in a vessel capable of blending the two, such as a mixer or reactor. The PVDF latex comprises PVDF, surfactant and water, and the water-reducible polymer phase comprises the acrylic polymer having ionic species, preferably side chain ionic species, and pigment in a dispersion form. In addition, either the PVDF latex or the acrylic polymer phase can comprise additives and/or fillers. The contents of the vessel are blended for a period of time sufficient to completely combine the PVDF latex and water reducible acrylic polymer phase, preferably from about 15 minutes to about 30 minutes.

After the blending is complete, a coagulant is added to the blend. The coagulant serves to destabilize the blend and causes the precipitation of the solids. Because of the ionic species of the water reducible polymer with the pigment, the acrylic polymer precipitates associating with pigment. During coagulation the acrylic polymer provides good interaction with the PVDF particles. This results in PVDF and pigment particles bound to solid acrylic polymer in the precipitate.

The choice of coagulant is dependant on the ionic species on the acrylic polymer. If the acrylic polymer comprises anionic species, acid coagulant is generally used, and if the acrylic polymer comprises cationic species, basic coagulant is used. Examples of acid coagulants are inorganic acids, such as nitric acid, hydrochloric acid, sulfuric acid, and the like, and combinations thereof. Examples of basic coagulants are ammonium hydroxide, sodium hydroxide, potassium hydroxide, sodium carbonate, potassium carbonate, and the like, and combinations thereof.

Now referring to FIG. 1 which shows the molecular aspects of the coagulation in an embodiment of the invention wherein the water reducible acrylic polymer phase comprises anionic species and acid coagulant is used. The acrylic polymer phase, which also can be referred to as the pigment dispersion, shown generally as 1, comprises acrylic polymer 2 in water reduced form having one or more anions 3, which may be side chain anionic moieties, and pigment 4 having high surface polarity which is in the form of a dispersion. The anions 3 of the acrylic polymer 2 interact with the high surface polarity of the pigment 4 such that the acrylic polymer 2 and the pigment 4 become associated by ionic interaction. The PVDF latex is shown generally in FIG. 1 as 6 and comprises PVDF 7 having one or more anions 8. The coagulant 9 forms solid precipitate material shown generally on the right side of the arrow in FIG. 1 as 10. When the coagulant 9 is added, the anions 3 of the acrylic polymer 2 in the water reducible acrylic polymer phase 1 which are not associated with pigment 4 are neutralized by action of the coagulant and the acrylic polymer 2 with associated pigment 4 precipitates from the water as pigment dispersed in an acrylic polymer binder, shown generally in FIG. 1 as 11. Likewise, the anions 8 of the PVDF 7 are neutralized by action of the coagulant 9 and the PVDF 7 precipitates as a solid dispersed in the neutralized acrylic polymer. As would be understood by one skilled in the art, the solid precipitated materials may also comprise solid additives and fillers either separately, associated with each other, associated with the acrylic polymer 2 and/or associated with the PVDF 7. If a cationic acrylic polymer is used, then the pigment should be selected to have an anionic charge in water to achieve the desired interaction between the acrylic polymer and pigment prior to coagulation.

The precipitate material is dried by means that would be appreciated by one skilled in the art, preferably by spray drying or filtering. Once the precipitate is dried, the PVDF-based powder coating composition is generally formed. Optionally, however, the dried precipitate may be ground to form the powder coating composition.

The powder coating compositions comprising PVDF and the pigment dispersed in the acrylic polymer binder can be applied to a substrate by any suitable means for achieving an even distribution of the particles. In particular, the powder can be applied by electrostatic spray application apparatus, whereby charged particles are sprayed on oppositely charged substrates. Other useful application techniques include, but are not limited to, cloud chambers, fluidized beds and the like. Such techniques will be understood by one skilled in the art and need not be described further.

After the coating is applied to the substrate, the coated substrate is then heated to a temperature between about 200° C. and about 280° C. to cure the coating by forming a continuous film. During the film forming process the PVDF and acrylic polymer become miscible and fuse in the form of the film. Because the pigment is well dispersed in the acrylic polymer binder, the pigment is generally evenly and uniformly distributed over the substrate. The acrylic polymer thus functions as a dispersion aid and no dispersion aid dedicated to disperse the polymer, such as surfactant, is necessary for the pigmented PVDF-based powder coatings of the invention.

EXAMPLE 500 grams of methy ethyl ketone solvent were placed into a one liter glass reactor equipped with a mechanical stirrer, a thermometer, a condenser and a dropping funnel. After heating the solvent to 75° C., 15 grams of benzoyl peroxide was added to the reactor. A mixture of uninhibited monomers comprising 284.7 grams of methyl methacrylate and 15.3 grams of methacrylic acid was slowly added to the reactor in increments of about 10 millimeters every 3 minutes, for a total of 90 minutes. The reaction between the methyl methacrylate and methacrylic acid was allowed to proceed an additional 90 minutes at 75° C. under agitation to obtain water reducible form of PMMA. The solution was permitted to cool to room temperature.

150 grams of the water reducible PMMA was added to a 16 ounce glass jar. The water reducible PMMA was partially neutralized with 5.9 grams of 5M ammonium hydroxide under agitation using a stirrer. After mixing, 109 grams of deionized water was added slowly to the glass jar under agitation. After obtaining a homogeneous solution of PMMA and deionized water, 52.5 grams of titanium dioxide (U.S.P. grade from Whittaker, Clark & Daniels) and 300 grams of soda-lime silicate glass beads having a diameter of about 3.0 millimeters from Quakenbush Company, Crystal Lake, Ill., U.S.A., were placed into the glass jar and the jar was sealed. The contents of the glass jar were then mixed by vigorous shaking by a mechanical shaker for 2 hours. The beads were removed by filtration to obtain an acrylic polymer phase comprising water reducible PMMA and titanium dioxide pigment in the form of a dispersion.

107 grams of the acrylic polymer phase was blended with a PVDF latex (HYLAR MP3 PVDF from Ausimont) containing 24.95 weight percent of the polymer under a slow agitation. 3.3 grams of concentrated nitric acid was added to the blend of PVDF and the water reducible acrylic polymer phase under slow agitation to coagulate the blend and the resulting precipitate was filtered and dried to form a powder. The powder was sprayed electrostatically onto a chromated aluminum substrate with a polarity about 30 to 40 KV and baked at 260° C. for 15 minutes. A film with 3 to 5 mil of thickness was formed. The film was observed to have even and full color.

What is claimed is:

1. A process for making a powder coating composition comprising the steps of blending a polyvinylidene fluoride ("PVDF") latex and a water reducible acrylic polymer phase having a water reducible acrylic polymer with ionic species anchored onto the surface of a pigment, adding coagulant to form a precipitate, separating the precipitate from water and drying the precipitate wherein the pigment and the PVDF are bound to the water reducible acrylic polymer in the precipitate and upon heating the PVDF and water reducible acrylic polymer become miscible and fuse in the form of a film.

2. The process of claim 1 wherein the PVDF is a homopolymer of vinylidene fluoride or a copolymer comprising vinylidene fluoride and other monomers.

3. The process of claim 2 wherein the copolymer comprises about 80% to about 99% vinylidene fluoride and about 1% to about 20% hexafluoropropylene.

4. The process of claim 1 wherein the water reducible acrylic polymer is a water reducible form of polyalkyl (meth)acrylate.

5. The process of claim 4 wherein the polyalkyl (meth)acrylate is prepared by polymerization of monomers selected from the group consisting of methyl methacrylate, ethyl methacrylate, methyl acrylate, ethyl acrylate, butyl methacrylate, butyl acrylate, hydroxyethyl methacrylate, hydroxyethyl acrylate and combinations thereof.

6. The process of claim 1 wherein the ionic species is anionic and the coagulant is an acid.

7. The process of claim 6 wherein the coagulant is an inorganic acid.

8. The process of claim 7 wherein the inorganic acid is selected from the group consisting of nitric acid, hydrochloric acid, sulfuric acid and combinations thereof.

9. The process of claim 1 comprising the additional step of incorporating flow promoters into the PVDF latex or water reducible acrylic polymer phase prior to adding the coagulant.

10. The process of claim 1 wherein the water reducible acrylic polymer and pigment have opposite ionic moieties and are associated by ionic interaction.

11. The process of claim 1 wherein the pigment comprises titanium dioxide.

12. A process for making a powder coating composition comprising the steps of blending a polyvinylidene fluoride ("PVDF") latex and a water reducible acrylic polymer phase having a water reducible acrylic polymer with cationic species and a pigment, adding coagulant that is a base to form a precipitate, separating the precipitate from water and drying the precipitate.

13. The process of claim 12 wherein the PVDF is a homopolymer of vinylidene fluoride or a copolymer comprising vinylidene fluoride and other monomers.

14. The process of claim 13 wherein the copolymer comprises about 80% to about 99% vinylidene fluoride and about 1% to about 20% hexafluoropropylene.

15. The process of claim 12 wherein the cationic water reducible acrylic polymer is a cationic water reducible form of polyalkyl (meth)acrylate.

16. The process of claim 15 wherein the cationic water reducible form of polyalkyl (meth)acrylate is prepared by polymerization of an alkyl (meth)acrylate with another (meth)acrylate containing amine group.

17. The process of claim 12 comprising the additional step of incorporating flow promoters into the PVDF latex or cationic water reducible acrylic polymer phase prior to adding the coagulant.

18. The process of claim 12 wherein the cationic water reducible acrylic polymer and pigment have opposite ionic moieties and are associated by ionic interaction.

19. The process of claim wherein the pigment comprises titanium dioxide.

20. The process of claim 12 wherein the base is selected from the group consisting of ammonium hydroxide, sodium hydroxide, potassium hydroxide, sodium carbonate, potassium carbonate and combinations thereof.

* * * * *

UNITED STATES PATENT AND TRADEMARK OFFICE
CERTIFICATE OF CORRECTION

PATENT NO. : 6,596,790 B2
DATED : July 22, 2003
INVENTOR(S) : Shiow-Ching Lin, et al.

It is certified that error appears in the above-identified patent and that said Letters Patent is hereby corrected as shown below:

<u>Column 8,</u>
Line 33, after "claim" insert -- 12 --

Signed and Sealed this

Fourth Day of November, 2003

JAMES E. ROGAN
*Director of the United States Patent and Trademark Office*